(12) United States Patent  (10) Patent No.: US 7,043,718 B1
Au et al.  (45) Date of Patent: May 9, 2006

(54) SYSTEM REAL-TIME ANALYSIS TOOL

(75) Inventors: Lap-Ki Au, San Jose, CA (US); Daniel Watkins, Saratoga, CA (US)

(73) Assignee: LSI Logic Corporation, Milpitas, CA (US)

( * ) Notice: Subject to any disclaimer, the term of this patent is extended or adjusted under 35 U.S.C. 154(b) by 562 days.

(21) Appl. No.: 10/077,066

(22) Filed: Feb. 15, 2002

(51) Int. Cl.
*G06F 9/44* (2006.01)
(52) U.S. Cl. ......................... 717/127; 714/45
(58) Field of Classification Search ............... 717/127, 717/128; 714/45, 704, 708, 712, 38; 702/176–178
See application file for complete search history.

(56) References Cited

U.S. PATENT DOCUMENTS

| 4,901,259 A | 2/1990 | Watkins ....................... 364/578 |
| 5,377,122 A | 12/1994 | Werner et al. ............... 364/488 |
| 5,581,482 A * | 12/1996 | Wiedenman et al. ........ 702/186 |
| 5,875,119 A * | 2/1999 | Bauman et al. .............. 702/181 |
| 5,970,439 A * | 10/1999 | Levine et al. ................ 702/186 |
| 5,995,916 A * | 11/1999 | Nixon et al. ................. 702/182 |
| 6,023,507 A * | 2/2000 | Wookey ....................... 709/224 |
| 6,202,199 B1 * | 3/2001 | Wygodny et al. ............ 717/125 |
| 6,230,295 B1 | 5/2001 | Watkins ....................... 714/742 |
| 6,405,327 B1 * | 6/2002 | Sipple et al. .................. 714/39 |
| 6,714,976 B1 * | 3/2004 | Wilson et al. ............... 709/224 |
| 6,801,940 B1 * | 10/2004 | Moran et al. ................ 709/224 |

OTHER PUBLICATIONS

Feather, MS; Fickas, S; van Lamsweerde, A; Ponsard, C; "Reconciling System Requirements and Runtime Behavior", Apr. 1998 ACM, retrieved Dec. 20, 2004.*

Melvin, Stephen; Patt, Yale N; "Microcode-Based Environment for Non-Invasive Performance Analysis", p. 171-177, 1986 IEEE, retrieved Dec. 20, 2004.*

Melvin, Stephen W; Patt, Yale N; "SPAM: A Microcode Based Tool for Tracing Operating System Events", p. 168-171, 1987 ACM, retrieved Dec. 20, 2004.*

Sandon, Peter A; Liao, Yuchung; "Performance Analysis Using A Non-Invasive Instruction Trace Mechanism", p. 308-314. retrieved Dec. 20, 2004.*

* cited by examiner

*Primary Examiner*—Wei Y. Zhen
*Assistant Examiner*—Mary Steelman
(74) *Attorney, Agent, or Firm*—Christopher P Maiorana PC

(57) ABSTRACT

An apparatus comprising a full system monitor. The monitor may be configured to monitor in real-time one or more (i) software variables down to change rates, (ii) hardware registers down to cycle rates, and (iii) firmware registers down to microcode fetch rates.

24 Claims, 5 Drawing Sheets

SYSTEM REAL-TIME ANALYSIS TOOL

FIELD OF THE INVENTION

The present invention relates to a method and/or architecture for implementing real-time system analysis generally and, more particularly, to a method and/or architecture for implementing complete real-time system analysis.

BACKGROUND OF THE INVENTION

Conventional methods and/or architectures that provide complete system analysis do not provide the system analysis in real-time. Conventional methods and/or architectures that provide real-time system analysis do not provide complete system analysis. Conventional methods and/or architectures for real-time system analysis have one or more of the following deficiencies (i) functioning of system level trace and coverage only, (ii) log files only on hardware and firmware register coverage, (iii) software register level trace is not known, (iv) unable to trace and cover every register within the system, (v) function level trace is not deep enough to provide an understanding of register level behavior, (vi) unable to generate log files within a real-time system application, and (vii) unable to trace and capture a complete depth of register trace and coverage.

It would be desirable to have a real-time system analysis method and/or architecture that provides (i) complete system analysis, (ii) register level trace with software-defined trigger and depth, (iii) frequency of register use (during read and/or write access), and/or (vi) timing between system events and/or register usage.

SUMMARY OF THE INVENTION

The present invention concerns an apparatus comprising a full system monitor. The monitor may be configured to monitor in real-time one or more (i) software variables down to change rates, (ii) hardware registers down to cycle rates, and (iii) firmware registers down to microcode fetch rates.

The objects, features and advantages of the present invention include providing a method and/or architecture for implementing complete real-time system analysis that may (i) provide real-time cycle-based register (or variable) access and coverage, (ii) provide non-intrusive register coverage, (iii) connect all address/data lines internally to the complete real-time system analysis tool and a system bus, (iv) provide a tool for real-time cycle-based or register-delta-based system trace/monitor/capture, (v) provide register level trace with software-defined trigger and depth, (vi) provide frequency of register use (e.g., for read and/or write access), (vii) provide timing between system events and/or register usage, (viii) provide system performance analysis including full system trace and verification self-test implemented via hardware, software, and/or firmware (e.g., micro-code) register access, (ix), provide real-time trace of hardware, software, and/or firmware (micro-code) register, (x) provide hardware, software, and/or firmware (micro-code) register coverage, (xi) provide windows to different levels of hardware, software, and firmware trace, (xii) provide a window within a trace feature, such that a start and/or stop trigger that corresponds to any register and/or variable may be user defined, (xiii) monitor any register and/or variable at any depth of trace in cycle accuracy, (xiv) record and/or time system events via real-time clock information, (xv) embed the complete real-time system analysis tool into an integrated circuit silicon chip, (xvi) internally connect the complete real-time system analysis tool to a system bus, (xvii) alternatively connect the complete real-time system analysis tool to additional internal and/or external system busses, and/or (xviii) provide register non-intrusive bus monitoring, capturing and/or register access.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
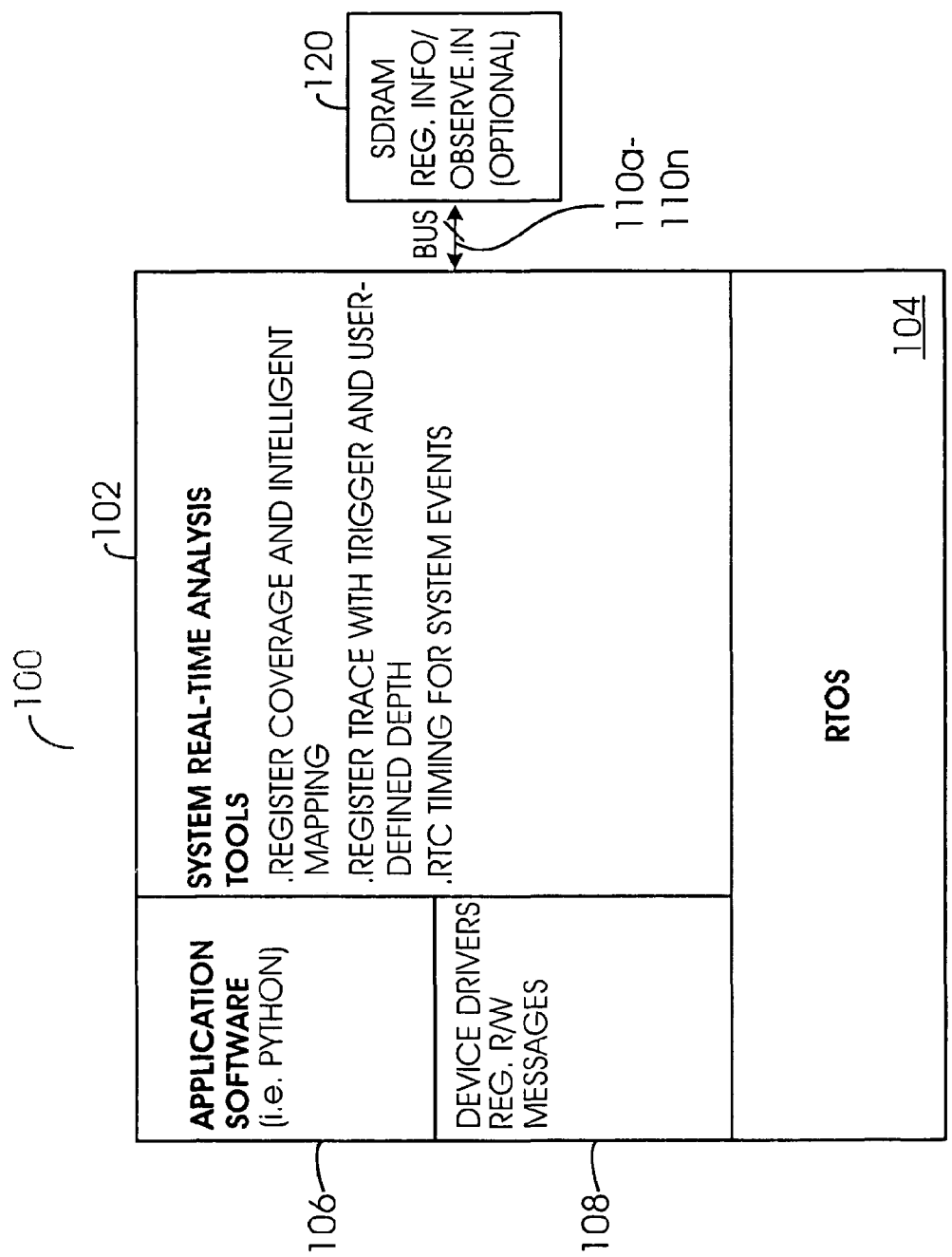
FIG. 1 is a block diagram of a preferred embodiment of the present invention.

Referring to FIG. 1, a block diagram illustrating a system 100 is shown in accordance with a preferred embodiment of the present invention. In one example, the system 100 may be represented via software architecture. The system 100 may provide embedded complete real-time system analysis that includes hardware, software, and/or firmware register coverage and trace. The system 100 may be configured to provide complete real-time trace, monitor, and/or capture during normal, debug, and/or test operations. The system 100 may be configured to perform software and/or firmware trace to inline assembly codes. The system 100 may be implemented as a scalable architecture. The system 100 may be adaptable for implementation in any system (not shown) configured having one or more internal busses and hardware, software, and/or firmware registers. The system 100 may be configured to monitor in real-time one or more software variables, hardware registers, and/or firmware registers.

The system 100 generally comprises a block (or section) 102, a block (or section) 104, a block (or section) 106, and a block (or section) 108. In one example, the block (or section) 102 may be coupled to a block (or circuit) 120 via one or more busses 110a–110n. The blocks 102, 104, 106 and 108 are generally implemented as hardware, software, and/or firmware blocks coupled via one or more device and/or system busses (not shown). The block 102 may be implemented as an embedded complete system real-time analysis tool (or monitor). The block 104 may be implemented as a real-time operating system (RTOS). The block 106 may be implemented as application software. The block 108 may be implemented as a number of device drivers (e.g., read/write message registers, etc.). The busses 110a–110n may be implemented as busses that are internal and/or external to the system 100. In one example, the circuit 120 may be implemented as a synchronous dynamic random access memory (SDRAM). In another example (not shown), the circuit 120 may be implemented as a hard drive disk (HDD). However, the circuit 120 may be implemented as any appropriate storage device and/or medium accordingly to meet the design criteria of a particular application.

In one example, the block 102 may be implemented as an integrated logic analyzer such as ChipScope™ (trademark of Xilinx®, Inc., San Jose, Calif.). However, the block 102 may be implemented as any appropriate real-time analysis tool accordingly to meet the design criteria of a particular application. The block (or circuit) 102 may be configured to provide (i) register coverage, (ii) intelligent mapping, (iii) register trace with trigger and user-defined depth, and/or (iv) real-time clock timing for system 100 events. The circuit (or block) 102 is generally internally coupled to all system 100 address and/or data lines (not shown).

The RTOS 104 may be implemented as any appropriate real time operating system accordingly to meet the design criteria of a particular application. The block 106 may be implemented as any appropriate application software accordingly to meet the design criteria of a particular application.

The bus 110 is generally configured as a multi-bit digital signal bus. In one example, the bus 110 may be implemented as an I-bus 110a (e.g., an internal system bus). In another example, the bus 110 may be implemented as an S-bus 110n (e.g., an external bus that may be compliant to a Fibre Channel standard). In another example, the bus 110 may be implemented as a combination of the I-bus 110a and the S-bus 110n. However, the bus 110 may be implemented as any appropriate number and/or protocol of bus and/or busses accordingly to meet the design criteria of a particular application.

In one example, the circuit 120 may be configured to store (or log) register information (e.g., address, data, corresponding real-time clock timing, etc.). In another example, the circuit 120 may be configured to store frequency of register use. However, the circuit 120 may be configured to store any appropriate system (e.g., register, bus, node, etc.) data and/or event information accordingly to meet the design criteria of a particular application. The storage to the circuit 120 may be implemented via one or more commands and/or files (e.g., Reg.info, Observe.in). However, the storage to the circuit 120 may be implemented via any appropriate method and/or architecture accordingly to meet the design criteria of a particular application.

Figure 2:
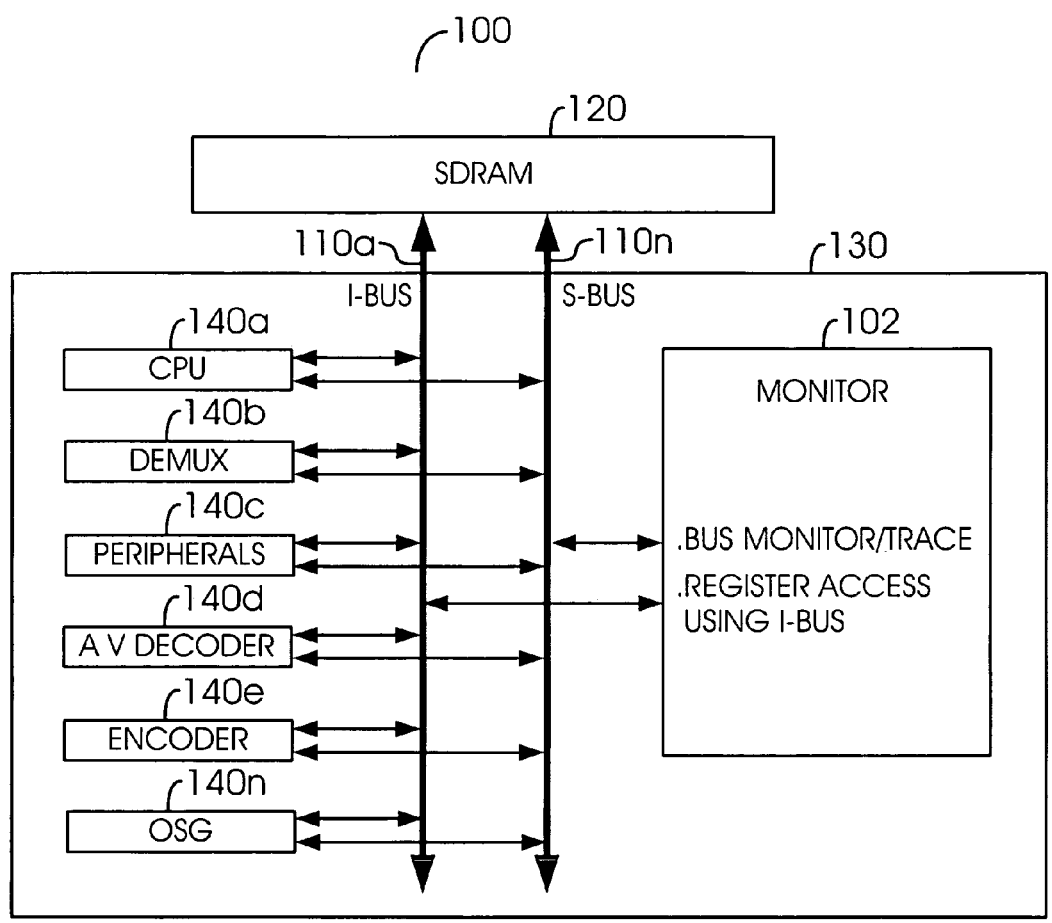
FIG. 2 is another block diagram of a preferred embodiment of the present invention.

Referring to FIG. 2, a block diagram illustrating the system (or circuit) 100 in accordance with a preferred embodiment of the present invention is shown. The system 100 may be implemented as a computer system, microcomputer, controller, micro-controller, microprocessor, microprocessor unit (MPU), etc., and/or one or more blocks (or circuits) thereof configured having an embedded complete (e.g., full) real-time system analysis tool.

The system 100 generally comprises a circuit (or block) 130 coupled to the circuit 120 via the bus 110. The circuit 130 generally comprises the monitor (or circuit) 102 and a number of circuits (or blocks) 140a–140n coupled to the bus (or busses) 110. The circuits 140a–140n may be implemented as sub-modules. The circuit (or block) 102 may be configured to provide complete real-time system analysis via (i) bus 110 monitor/trace/capture and (ii) register (not shown) access via the bus 110. The circuit 102 may be embedded in an integrated circuit silicon.

In one example, the circuit 140a may be implemented as a central processing unit (CPU). The circuit 140b may be implemented as a number of demultiplexer circuits. The circuit 140c may be implemented as a number of peripherals (e.g., infrared receiver/transmitters, interface circuits, etc.). The circuit 140d may be implemented as an audio/video (AV) decoder circuit. The circuit 140e may be implemented as an encoder circuit. The circuit 140n may be implemented as an on-screen graphics (OSG) circuit. However, any appropriate number and/or type of circuits and/or devices 140 may be coupled to the bus 110 accordingly to meet the design criteria of a particular application. In another example (not shown), one or more additional tools (e.g., timing analysis tools, debugging tools, etc.) may be embedded in the circuit 130.

Figure 3:
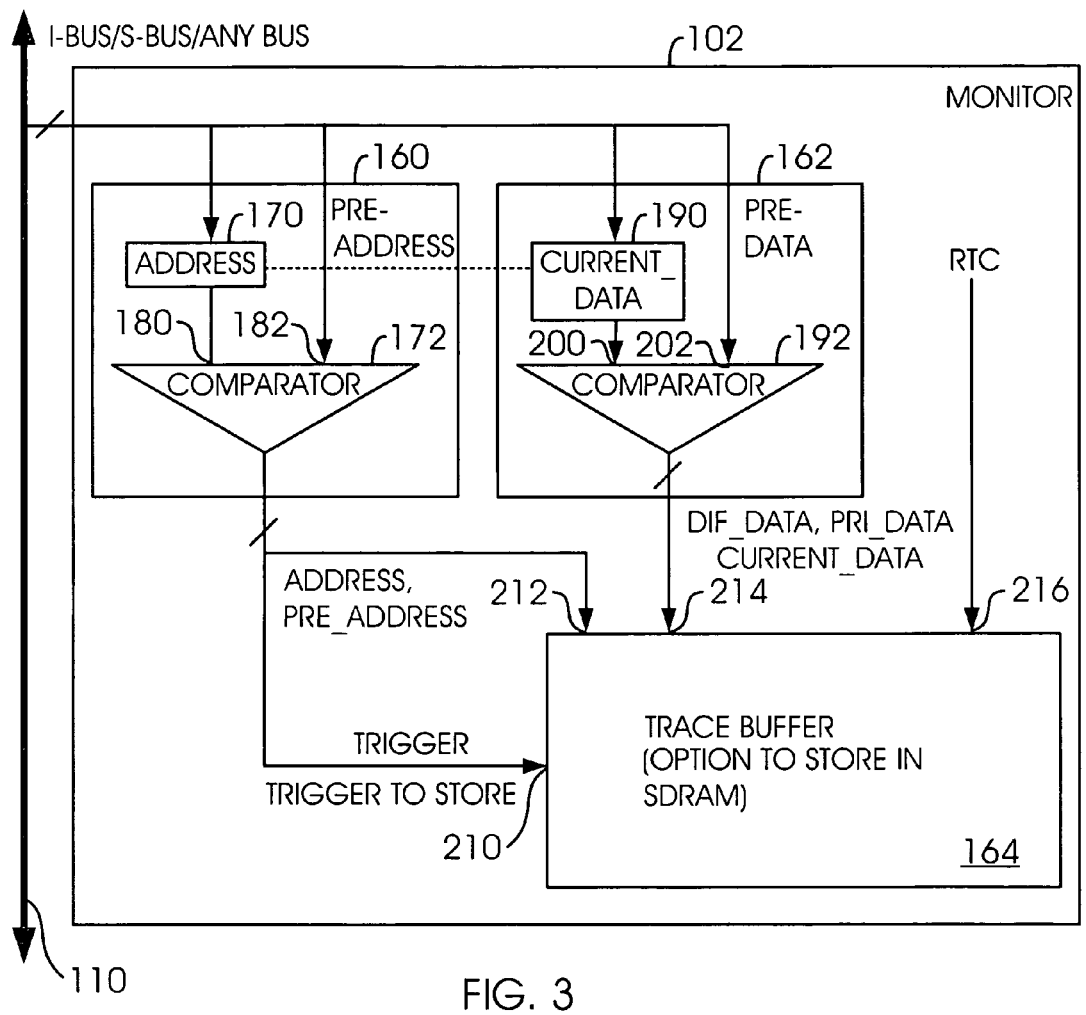
FIG. 3 is a block diagram of a bus monitor/capture circuit in connection with the present invention.

Referring to FIG. 3, a block diagram illustrating an example of the circuit 102 is shown. The circuit 102 may be configured as a bus access/monitor/capture circuit. The circuit 102 may be configured to provide real-time access, monitoring, and/or capture of any bus (e.g., the bus 110) and/or bus activity (e.g., software variables) in the system 100. The circuit 102 may be configured to provide a window of trace. In one example, the circuit 102 may comprise a circuit 160, a circuit 162, and a circuit 164. The circuits 160 and 162 may be implemented as comparator circuits. The circuit 164 may be implemented as a buffer circuit.

The circuit 160 may comprise a circuit 170 and a circuit 172. The circuit 170 may be implemented as a register circuit. The circuit 172 may be implemented as a comparator circuit. The circuit 170 may be configured to register a current address signal (e.g., ADDRESS). During one mode of operation, the circuit 172 may have an input 180 that may receive the signal ADDRESS, an input 182 that may receive a previous address signal (e.g., PRE_ADDRESS), and an output that may present a signal (e.g., TRIGGER) and/or the signals ADDRESS and/or PRE_ADDRESS. The signal PRE_ADDRESS may be a user defined address that corresponds to a particular system activity (e.g., register access, read, write, etc.). The signal TRIGGER may be implemented as a control signal configured to control a start and/or a stop of access/monitor/trace/store activities of the circuit 102. The signal TRIGGER may be implemented as the signal ADDRESS, the signal PRE_ADDRESS, the difference between the signals PRE_ADDRESS and ADDRESS, a logical HIGH (e.g., on or 1), a logical LOW (e.g., off or 0), or any appropriate signal to meet the design criteria of a particular application.

The circuit 162 may comprise a circuit 190 and a circuit 192. The circuit 190 may be implemented as a register circuit. The circuit 192 may be implemented as a comparator circuit. The circuit 190 may be configured to register a current data signal (e.g., CURRENT_DATA). During one mode of operation, the circuit 192 may have an input 200 that may receive the signal CURRENT_DATA, an input 202 that may receive a previous data signal (e.g., PRE_DATA), and an output that may present a signal (e.g., DIF_DATA). The signal CURRENT_DATA may be a data signal that corresponds to the current address ADDRESS. The signal PRE_DATA may be a data signal that corresponds to the previous address signal PRE_ADDRESS. The signal DIF_DATA may be generated as the difference between the signals PRE_DATA and DATA.

In one example, the circuit 192 may be configured to present the signal DIF_DATA when the signals CURRENT_DATA and PRE_DATA match. In another example, the circuit 192 may be configured to present the signal DIF_DATA when the signals CURRENT_DATA and PRE_DATA differ by a predetermined value (amount). In another example, the circuit 192 may be configured to present the signal DIF_DATA when the signals ADDRESS and PRE_ADDRESS match. In another example, the circuit 192 may be configured to present the signal DIF_DATA when the signals ADDRESS and PRE_ADDRESS differ by a predetermined value (amount). However, the circuit 162 may be configured to generate the signal DIF_DATA in response to any appropriate system activity (e.g., event) to meet the design criteria of a particular application.

The circuit 164 may be implemented as a trace buffer circuit. The circuit 164 may have an input 210 that may receive the signal TRIGGER, an input 212 that may receive the signal ADDRESS and/or the signal PRE_ADDRESS, an input 214 that may receive the signals DIF_DATA, CURRENT_DATA, and/or PRE_DATA, and an input 216 that may receive a signal (e.g., RTC). The signal RTC may be implemented as a real-time clock signal for the system (monitor) 100. The signal RTC may be configured to provide a real-time stamp to the information stored via the circuit 102. The signal RTC may be configured to provide a start/stop trigger (e.g., the signal TRIGGER). The circuit 102 may be configured to non-intrusively access, monitor, and/or capture activity on the bus 110. The circuit 102 may be configured to register/store/capture activity on the bus 110 via the circuit 164 in response to the signals TRIGGER and/or RTC.

In another example, the circuit 100 may be configured to store the information generated via the circuit 102 (e.g., the software variable signals ADDRESS, DIF_DATA, RTC, etc.) in the buffer 164 and the circuit 120. In another example (not shown), the circuit 164 may be optional. The circuit 100 may be configured to directly store the information generated via the circuit 102 in the circuit 120.

In one example, the circuit 102 may be configured to generate the signal TRIGGER when the signals ADDRESS and PRE_ADDRESS match. In another example, the circuit 102 may be configured to generate the signal TRIGGER when the signals ADDRESS and PRE_ADDRESS differ by a predetermined value (amount). In another example, the circuit 102 may be configured to generate the signal TRIGGER when the signals CURRENT_DATA and PRE_DATA match. In another example, the circuit 102 may be configured to generate the signal TRIGGER when the signals CURRENT_DATA and PRE_DATA differ by a predetermined value (amount) (e.g., the signal TRIGGER may be register-delta based). In another example, the circuit 102 may be configured to generate the signal TRIGGER in response to the signal RTC (e.g., the signal TRIGGER may be cycle-based). However, the circuit 160 may be configured to generate the signal TRIGGER in response to any appropriate signal, user defined parameter (e.g., via software), and/or system activity (or event) to meet the design criteria of a particular application. The signal TRIGGER may be configured to implement (enable) one or more user defined windows of trace and capture that may correspond to any register (not shown) and/or (software) variable (e.g., the signals ADDRESS, PRE_ADDRESS, CURRENT_DATA, PRE_DATA, etc.) in the system 100.

The block 102 may be configured to selectively monitor a specific one or more of the system 100 software variables, hardware registers, and/or firmware registers. The monitor 102 generally comprises software, hardware, and/or firmware register coverage. The block 102 is generally configured to monitor one or more addresses (e.g., the signals ADDRESS and PRE_ADDRESS), data (e.g., the signals PRE_DATA, CURRENT_DATA, and DIF_DATA), and/or a trigger (e.g., the signals RTC, TRIGGER, etc.) trace.

Figure 4:
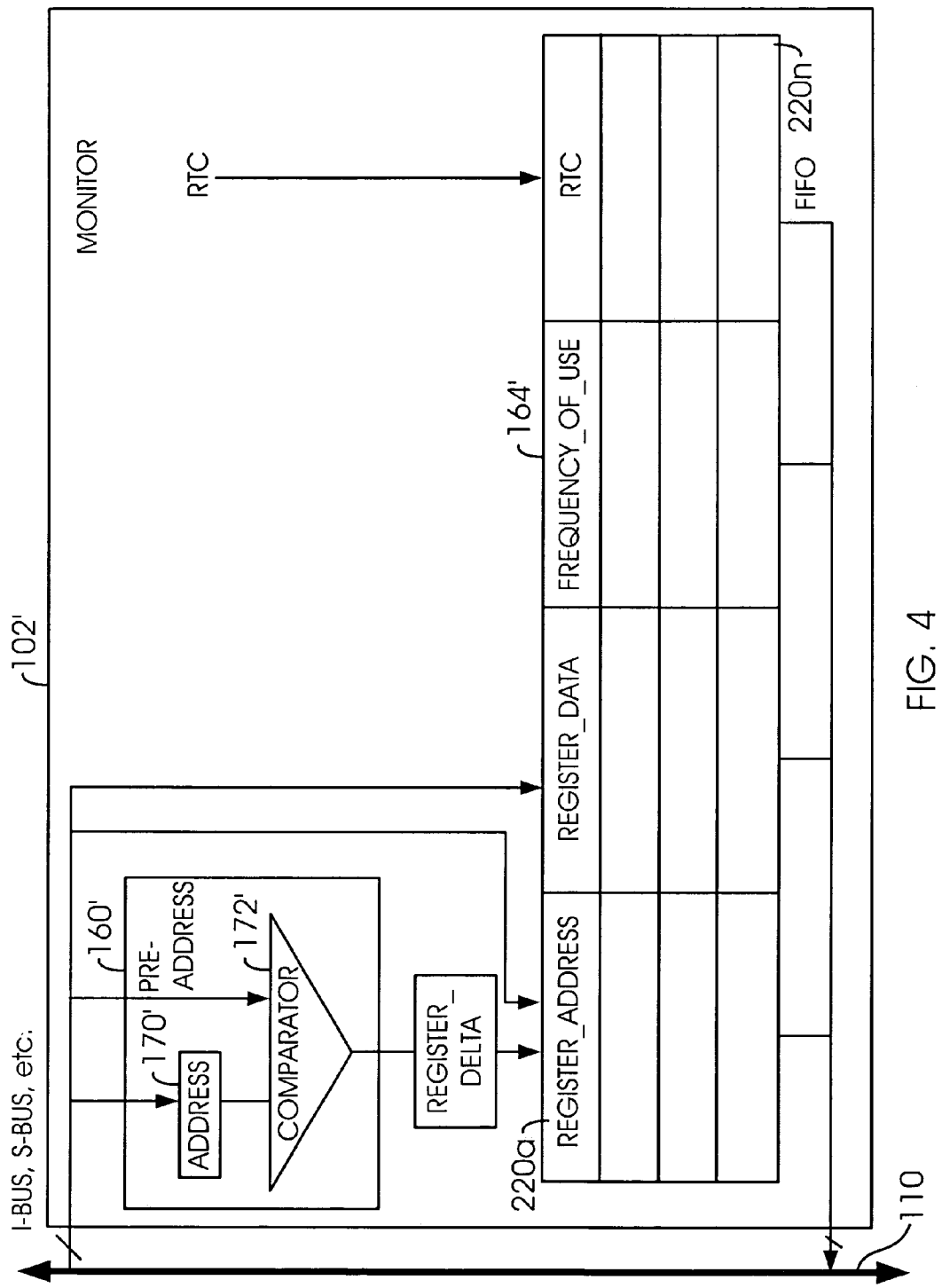
FIG. 4 is a block diagram of a register access circuit in connection with the present invention.

Referring to FIG. 4 a block diagram of a circuit 102' illustrating another example of the monitor circuit of the present invention is shown. The circuit 102' may be implemented similarly to the circuit 102. The circuit 102' may have an input and an output that are coupled to the bus 110. The circuit 102' may be configured as a register access circuit. The circuit 102' generally comprises a circuit 160' and a circuit 164'. The circuit 160' may be implemented similarly to the circuit 160. The circuit 164' may be implemented similarly to the circuit 164. In one example the circuit 164' may be implemented as a first-in/first-out (FIFO) and/or bank of FIFOs comprising a number of registers 220a–220n. The circuit 102' may be configured to provide real-time access, monitoring, and/or capture of any register (not shown) coupled to the bus 110 and/or register activity (e.g., read, write, etc.) in the system 100. The system 100 registers may be implemented as hardware, software, and/or firmware registers.

The circuit 160' generally comprises a register 170' and a comparator 172'. In one example, the circuit 160' may be configured to generate a signal (e.g., REGISTER_DELTA) in response to the signals ADDRESS and PRE_ADDRESS. In another example, the circuit 160' may be configured to generate the signal REGISTER_DELTA in response to a match and/or a difference in the data that is registered in a particular location that corresponds to the signals REGISTER_ADDRESS, ADDRESS and/or PRE_ADDRESS. However, the circuit 160' may be configured to generate the signal REGISTER_DELTA in response to any appropriate event, address, register, node, bus, etc. accordingly to meet the design criteria of a particular application.

The circuit 164' may have an input and an output that are directly coupled to the bus 110. The circuit 164' may be configured to register/store/capture a number of signals (e.g., REGISTER_ADDRESS, REGISTER_DATA, FREQUENCY_OF_USE, and/or RTC) in response to one or more of the stored signals and/or any appropriate control signals (e.g., the signals RTC, REGISTER_DELTA, etc.) accordingly to meet the design criteria of a particular application. However, other signals may be captured via the circuit 164' accordingly to meet the design criteria of a particular application.

In another example, the circuit 164' may be configured to register/store the signals REGISTER_ADDRESS, REGISTER_DATA, FREQUENCY_OF_USE, and/or RTC on a running basis. The signals REGISTER_ADDRESS, REGISTER_DATA, FREQUENCY_OF_USE, and/or RTC may be shifted through the FIFO 164' in response to the clock signal RTC and/or any appropriate control signal (not shown). The circuit 164' may be configured to store the signals REGISTER_ADDRESS, REGISTER_DATA, FREQUENCY_OF_USE, and/or RTC for T cycles, where T is an integer that generally corresponds to the depth of the FIFO circuit 164'. The signal REGISTER_ADDRESS may correspond to a particular register location. The address signal REGISTER_ADDRESS may be user defined. The signal REGISTER_DATA may be data that is registered in a particular location that corresponds to the signals REGISTER_ADDRESS, ADDRESS and/or PRE_ADDRESS.

The signal FREQUENCY_OF_USE may be implemented as a value that corresponds to a frequency of use of a particular register. In one example, the signal FREQUENCY_OF_USE may be configured to correspond to the address signal REGISTER_ADDRESS. However, the signal FREQUENCY_OF_USE may be configured to correspond to any appropriate register to meet the design criteria of a particular application.

In another example, the circuit 100 may be configured to store (e.g., log) the information generated via the circuit 102' (e.g., the signals REGISTER_DATA, RTC, etc.) in the circuit 164' and the circuit 120. In yet another example (not shown), the circuit 164' may be optional and the circuit 100 may be configured to directly store the information generated via the circuit 102' in the circuit 120.

The signals ADDRESS, PRE_ADDRESS, CURRENT_DATA, RTC, etc. are generally system signals generated in response to the circuits 140. The signals ADDRESS, PRE_ADDRESS, CURRENT_DATA, RTC, etc. generally correspond to system 100 activity (e.g., events) via the bus 110 and the system registers (not shown) coupled to the bus 110.

Figure 5:
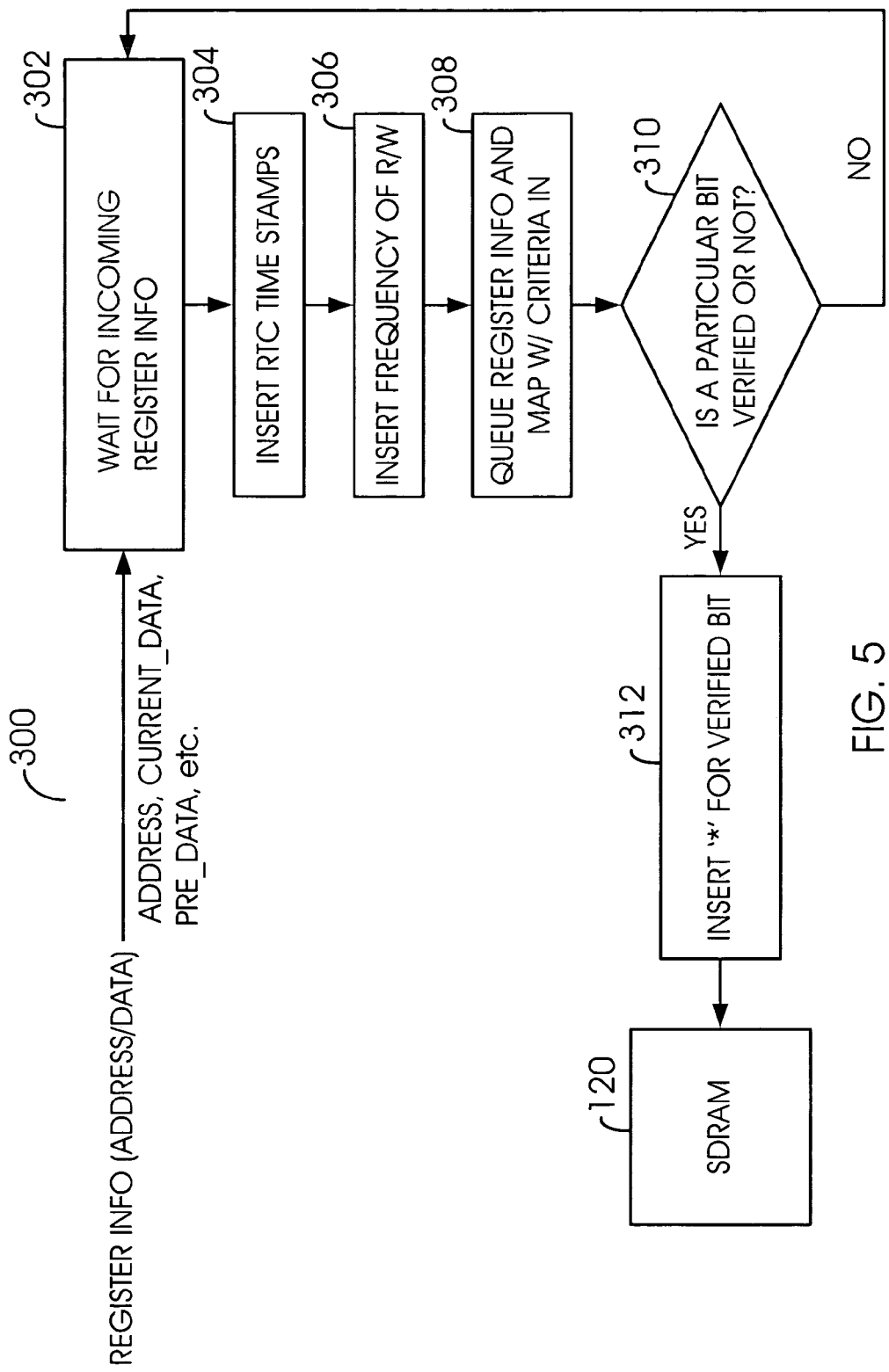
FIG. 5 is a flow chart illustrating an operation of the present invention.

Referring to FIG. 5, a flow diagram 300 illustrating a process (e.g., operation, method, routine, etc.) of the present invention is shown. The process 300 may be implemented as a register coverage process. The process 300 may be implemented via the system (or circuit) 100. The process 300 generally comprises a state (or block) 302, a state (or block) 304, a state (or block), 306, a state (or block) 308, a decision state (or block) 310, a state (or block 312), and the circuit 120.

During the state 302, the method 300 may be configured to wait for incoming register information. The incoming register information may be any appropriate information registered at any particular register in the system 100 (e.g., the signals ADDRESS, CURRENT_DATA, PRE_DATA, etc.). When the appropriate information is registered at the state 302, the process 300 may continue to the state 304.

During the state 304, the process 300 may be configured to insert real-time clock stamps (e.g., the signal RTC). In one example, the state 304 may load the signal RTC into the FIFO 164'. However, the method 300 may be configured to provide any appropriate real-time stamps accordingly to meet the design criteria of a particular application. The process 300 may then continue to the state 306.

During the state 306, the method 300 may be configured to insert a frequency of read and/or write operations (e.g., the signal FREQUENCY_OF_USE) at the particular register that is monitored via the process 300. In one example, the state 304 may load the signal FREQUENCY_OF_USE into the FIFO 164'. The process 300 may then continue to the state 308.

During the state 308, the process 300 may be configured to (i) queue the register information (e.g., the signals ADDRESS, CURRENT_DATA, PRE_DATA, RTC, FREQUENCY_OF_USE, etc.) and (ii) map the queued information via an appropriate command, command sequence, hardware configuration, etc. In one example, the command may be implemented as the command Criteria.in. However, the register information may be queued and mapped by any appropriate command accordingly to meet the design criteria of a particular application. The process 300 may continue to the state 310.

The state 310 may be configured to determine whether or not a particular bit (e.g., a bit in the buffer 164 or the FIFO 164') is verified. In one example, the particular bit to be checked for verification may be user selected. When a particular bit is verified, the process 300 may continue to the state 312.

During the state 312, the method 300 may be configured to insert a flag (e.g., a "*" or any unique and/or appropriate indicator) for the verified bit. The process 300 may be configured to store (load) the register information in the circuit 120. Returning to the state 310, when the particular bit is not verified, the method 300 may be configured to return to the state 302. When a bit is verified, post-processing (not shown) may be configured to be more efficient via processing (or not processing) only the signals that contain one or more verified bits.

The system 100 may be configured to generate post-processing of the trace to assess register coverage. The system 100 may be configured to selectively monitor one or more of the hardware and/or firmware registers to implement (i) a verification self-test, (ii) a diagnostic method and/or (iii) monitoring for firmware and/or software development.

The system 100 may be configured to generate an analysis (not shown) of filtering trace and capture. The system 100 may be configured to provide the filtering in response to the output of the comparators 172, 172' and/or 192 (e.g., the signals TRIGGER, DIF_DATA, REGISTER_DELTA, etc.) and/or the verified (or not verified) bits. The system 100 may be configured to filter the system hardware and/or firmware registers to bit level (via the process 300) such that remaining bits in the full system after the filtering may be assessed to achieve full coverage.

The system 100 generally comprises software defined monitor, trace, and/or capture in hardware, software, and/or firmware that corresponds to trigger, log depth, and/or trace windows. The system 100 may be configured to generate a time granularity (not shown) of the time stamp (e.g., the signal RTC) between system events and register events that are monitored (e.g., the signals TRIGGER, ADDRESS, CURRENT_DATA, REGISTER_DATA, REGISTER_DELTA, etc.).

The system 100 may be configured to provide a real-time full system analysis that implements complete software variable (e.g., the signals ADDRESS, CURRENT_DATA, etc.) and hardware, software, and/or firmware register coverage and trace. The system 100 may be configured to provide trace and cover of any particular register. The system 100 may be configured to provide function level trace at any register depth. The system 100 may be configured to provide the user understanding of register level behavior at any depth (e.g., via the circuit 102 directly coupled to the bus 110). The system 100 may be configured to generate software variable and hardware, software and/or firmware register log files during real-time (e.g., via capturing/mapping/storing in the buffer 164, the FIFO 164', and/or the circuit 120). The system 100 may be configured to provide trace and capture at any depth of register trace and coverage. The system 100 may be configured to simultaneously monitor (i) software variables down to change rates, (ii) hardware registers down to cycle rates, and/or (iii) firmware registers down to microcode word fetch rates (e.g., via the signals TRIGGER, RTC, etc.).

The system 100 may be configured to provide complete system performance analysis in real-time (e.g., in response to the signal RTC). The system 100 may be configured to provide full system trace and verification self-test implemented via hardware, software, and/or firmware (e.g., micro-code) register access via the circuits (or blocks) 102 and/or 102'. The system 100 may be configured to provide (i) real-time trace of one or more hardware, software, and/or firmware (micro-code) registers, (ii) hardware, software, and/or firmware (micro-code) register coverage, (iii) one or more windows to different levels of hardware, software, and/or firmware trace (e.g., via the circuits 102 and/or 102' coupled directly to the bus 110), (iv) a window within a trace feature, such that a start and/or stop trigger that corresponds to any register and/or variable (e.g., via the signals TRIGGER, RTC, REGISTER_DELTA, etc.) may be user defined.

The system 100 may be configured to (i) monitor any register and/or variable at any depth of trace in cycle accuracy, (ii) record and/or time system events via real-time clocking (e.g., the signal RTC), and (iii) provide timing between system events and/or register usage (e.g., via the signal RTC time stamps, the signal FREQUENCY_OF_USE, etc.). The system 100 may be implemented as a complete real-time analysis tool (e.g., the block 102) that is embedded into an integrated circuit silicon (not shown). The system 100 may be configured to provide non-intrusive bus and/or register access/monitor/capture via internal connection to one or more internal and/or external integrated circuit busses (e.g., the busses 110a–110n).

The present invention may implement a hardware, software, and/or firmware complete real-time trace, monitor, and/or capture process. Conventional software and firmware trace is constrained to inline assembly codes only. The system 100 may be implemented as an embedded complete real-time analysis full system that may be internally connected to one or more system busses (e.g., the I-Bus 110a, the S-Bus 110n, etc.) of an integrated circuit. The system 100 may be configured to monitor bus activity among sub-modules (e.g., the sub-modules 140a–140n that correspond to transport, on-screen graphics (OSG), peripherals, CPU, etc.) within the integrated circuit.

The system 100 may be configured having both address and data line comparators (e.g., the comparators 172, 172', and 192) that may be configured to implement particular hardware, software, and/or firmware defined addresses and/or data capture in response to a trigger (e.g., the signal TRIGGER). The system 100 may be configured to provide one or more start/stop trigger signals (e.g., the signals TRIGGER, RTC, etc.). The trigger signals may be user defined via software and/or any other appropriate method and/or architecture to meet the design criteria of a particular application. The trigger signal may be an option on cycle-based or register-delta-based implementations of the present invention (e.g., the circuit 102').

The present invention may be configured to insert a real-time clock time stamp (e.g., the signal RTC) to register trace information that corresponds to the monitor 100 time. The present invention may implement real-time clock information (via the signal RTC) and calculate/compare time differences between system events. The present invention may be configured to provide low-level (e.g., any particular register-level) performance of the integrated circuit where the system 100 is implemented. The present invention may be configured having multiple analysis tools embedded into one system (or one integrated circuit) simultaneously.

The present invention may be configured to provide a window of trace operation. The window of trace may be configured to provide step/trace of activity on a particular bus 110 and/or register. In one example, the system 100 may be configured to step through a particular register (or variable) on any sub-module 140 and monitor/store/capture/map/log the appropriate information of how the particular register (or variable such as the signals ADDRESS, CURRENT_DATA, etc.) changes from a number of previous cycles. In one example, the system 100 may be configured to monitor/store/capture/map/log for 10 system cycles. However, the number of previous cycles is generally implemented and/or selected as any appropriate number to meet the design criteria of a particular application.

The system 100 may be configured to provide a user programmable trigger point (e.g., the signal TRIGGER may be programmable) to select when to start and/or stop a trace. The system 100 may be configured to provide a register-delta-based step/trace (e.g., a register step/trace based on change in the information that is registered in one or more particular registers). In one example, the present invention may be configured to start a trace and obtain information of how a particular register (or variable) changes relative to a given number of previous changes (register delta). The system 100 may be configured to provide step/trace for a given number of read/write operations of a particular register (or variable). The system 100 may be configured to generate an analysis (not shown) of time difference that corresponds to values monitored (e.g., one or more of the signals ADDRESS, CURRENT_DATA, etc.) via the signal TRIGGER.

In one example, a CPU (e.g., the CPU 140a) may be configured to poll the frequency of read/write operations of a register and/or the signal TRIGGER (e.g., generate (calculate) the signal FREQUENCY_OF_USE). When the frequency count matches (or reaches) a predetermined number in a software-programmed counter (not shown), the CPU 140a may be configured to return the register information (e.g., generate a trace that corresponds to the signals ADDRESS, PRE_ADDRESS, CURRENT_DATA, REGISTER_ADDRESS, etc.) and/or register delta (e.g., the signals REGISTER_DELTA, DIF_DATA, etc.) to the user and/or store (log) the information (e.g., in the circuit 120).

The operating parameters of the system 100 (e.g., the particular registers to monitor/trace/capture/log, depth of trace, bus and/or bus activity to monitor/trace/capture/log, trigger variables, etc.) may be defined via a software setup. However, the system 100 operating parameters may be defined via any appropriate method and/or architecture to meet the design criteria of a particular application.

The present invention may be configured to monitor any register (and/or variable) via a software-defined depth of trace. The system 100 may be configured to provide tracing on any appropriate bus and/or busses on the integrated circuit where the system 100 is embedded (e.g., the I-Bus 110a, the S-Bus 110n, etc.). The present invention may be configured to save (store, register, load) register information (and/or delta/change of register information) into a FIFO (e.g., the FIFO 164') and/or (optionally) store the register information (and/or delta/change of register information) into an SDRAM (e.g., the circuit 120). The system 100 may be configured to provide a trace buffer (e.g., the circuit 164). Information stored in the trace buffer 164 (e.g., the signals ADDRESS, PRE_ADDRESS, CURRENT_DATA, etc.) may be post-processed and/or implemented in a coverage operation (e.g., the process 300).

In one example, the system 100 may be internally coupled to an integrated circuit I-Bus (e.g., the bus 110a) to provide complete register access. The system 100 may be configured to directly receive register read/write information (e.g., the signals ADDRESS, PRE_ADDRESS, CURRENT_DATA, etc.), via reading the I-Bus 1a address/data lines. The present invention may be configured to provide frequency of use information that corresponds to each register (e.g., the signal FREQUENCY_OF_USE) and a real-time clock stamp (e.g., the signal RTC). The present invention may be configured to provide non-intrusive register information via directly capturing the register information from the I-Bus 110a. The present invention may be configured to save register information into a trace buffer (e.g., the circuit 164), a FIFO (e.g., the circuit 164') and/or in a SDRAM (e.g., the circuit 120).

The system 100 may be configured to update a register delta (e.g., the signals REGISTER_DELTA, DIF_DATA, etc.) in real-time and/or via cycle-based timing (e.g., in response to the signal RTC). In one example, the system 100 may be configured to provide analysis/update/store operations on register information for each delta (change) of register address and/or data information on the I-Bus 110a. In another example, the system 100 may be configured to provide register masking for all registers that are verified.

The system 100 may be configured to save register information only when there is a register delta (e.g., not save every register signal and/or bit). In one example operation, the system 100 may have Q registers containing information and only Y registers containing information that has changed (e.g., having a delta or different format), where Q and Y are integers. The storage of the relevant register information may be implemented via Y amount of space (e.g., storage space that may correspond to Y registers) in a memory (e.g., the circuit 120). The present invention may be configured to conserve memory space and chip area and cost. The present invention may be configured to provide more efficient post-processing coverage data. The present invention may implement one or more commands (e.g., Criteria.in and/or Observe.in) to provide register checking and/or masking. The system 100 is generally configured to insert an indicator flag (e.g., a unique symbol such as an "*") to the respective register when a particular bit is verified. The system 100 is generally configured to store the information and/or bits in the verified registers to memory (e.g., the circuit 120).

The present invention may be configured to provide (i) real-time cycle-based register (or variable) access and coverage, (ii) non-intrusive register coverage, (iii) internal connection of all address/data lines to a complete real-time analysis tool and an integrated circuit system bus (e.g., an I-Bus such as the bus 110a), (iv) a tool for real-time cycle-based and/or register-delta-based system trace/monitor/capture, (v) register level trace having software-defined trigger and depth, (vi) frequency of register use (for read and/or write access), and/or (vii) provide timing between system events and/or register usage.

In one example, the present invention may be implemented to identify potential direct memory access (DMA) hanging. The present invention may be configured to capture and monitor variable activities (events) before the system (or circuit) implementing the present invention hangs. The present invention may be configured to internally capture and monitor a system bus (e.g., the I-Bus 110a) activity (or registers near a direction register such as a DIDLE register) for every bus cycle (e.g., every cycle of the clock signal RTC). The present invention may be configured to store (load, fill) data into a trace buffer (e.g., the circuit 164). The present invention may be configured to save and read back the buffered trace data (e.g., the signals ADDRESS, PRE_ADDRESS, CURRENT_DATA, PRE_DATA, etc.) if a DMA hang occurs.

In another example, the present invention may be implemented to indicate a potential start code detect (SCD) interrupt bit (not shown) issue. The system 100 may be configured to capture and/or monitor SCD count and interrupt register activity on a real-time basis (e.g., in response to the signal RTC). The system 100 may be configured to record changes of a count register (not shown) and monitor an interrupt bit for multiple patterns within a DMA transfer. The system 100 may be configured to provide an alternative method for analysis of the SCD interrupt bit in a digital video transport (DVT).

The system 100 may be configured to enhance a transport timing determination. The system 100 may be configured to provide accuracy timing that corresponds to the length of time the transport module (not shown) demultiplexes incoming streams. Accuracy timing may provide an aid to a silicon design team to improve transport performance.

The system 100 may be configured to provide hardware, software, and/or firmware register coverage. In one example, the present invention may be configured to provide bus signal monitoring/capturing (e.g., via the circuit 102). In another example, the present invention may be configured to provide a trace trigger (e.g., the signal TRIGGER) in response to an address and/or data delta (change) (e.g., a difference between the signals ADDRESS and PRE_ADDRESS an/or the signals CURRENT_DATA and PRE_DATA, respectively).

The present invention may be configured to provide software register and/or variable (e.g., the signals ADDRESS, CURRENT_DATA, etc.) trace via a software-defined trigger (e.g., the signal TRIGGER) and depth (e.g., the particular bus and/or register monitored). The present invention may also be configured to provide a trace trigger (e.g., the signal TRIGGER) in response to a register delta (e.g., a change in the signal CURRENT_DATA). The system 100 may be configured to capture/save/store/log information generated via a buffer (e.g., the circuit 164), a FIFO (e.g., the circuit 164'), an SDRAM (e.g., the circuit 120), a HDD (not shown), and/or any appropriate storage medium (not shown).

The present invention may significantly reduce the amount of integrated circuit verification time. The present invention may shorten the analysis time for a variety of real-time applications. The present invention may reduce issue investigation (e.g., debug) time and contribute to bringing products to market more rapidly.

As used herein, the term "simultaneously" is meant to describe events that share some common time period but the term is not meant to be limited to events that begin at the same point in time, end at the same point in time, or have the same duration.

The present invention thus may also include a computer product which may be a storage medium including instructions which may be used to program a computer to perform a process in accordance with the present invention. The storage medium may include, but is not limited to, any type of disk including floppy disk, optical disk, CD-ROM, and magneto-optical disks, ROMs, RAMs, EPROMs, EEPROMS, flash memory, magnetic or optical cards, or any type of media suitable for storing electronic instructions.

The present invention may also be implemented by the preparation of ASICs, FPGAs, or by interconnecting an appropriate network of conventional component circuits (such as conventional circuit implementing a state machine), as is described herein, modifications of which will be readily apparent to those skilled in the art(s).

The various signals of the present invention are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed) accordingly to meet the design criteria of a particular implementation. Additionally, inverters may be added to change a particular polarity of the signals.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
    a full system monitor configured to (i) monitor in real-time one or more software variables down to change rates, (ii) monitor in real-time one or more hardware registers down to cycle rates, (iii) monitor in real-time one or more firmware registers down to microcode word fetch rates, and (iv) monitor and calculate a frequency of use of each bit in said one or more hardware registers and said one or more firmware registers in response to one or more trigger signals, wherein said one or more trigger signals is generated by a first comparator circuit.

2. The apparatus according to claim 1, wherein said apparatus is configured to monitor said one or more software variables, said hardware registers, and said firmware registers simultaneously.

3. The apparatus according to claim 1, wherein said apparatus provides a register level trace.

4. The apparatus according to claim 3, wherein said apparatus is configured to generate one or more log files in response to said monitoring.

5. The apparatus according to claim 3, wherein said apparatus further comprises one or more user defined start/stop triggers configured to start/stop one or more of said firmware registers, said hardware registers, and said software variables.

6. The apparatus according to claim 3, wherein said apparatus is configured to generate post-processing of said trace to assess register coverage.

7. The apparatus according to claim 1, wherein said apparatus is configured to selectively monitor a specific one or more of said software variables, hardware registers, and firmware registers.

8. The apparatus according to claim 1, wherein said apparatus further comprises software, hardware and firmware register coverage.

9. The apparatus according to claim 1, wherein said apparatus is configured to selectively monitor one or more of said hardware and firmware registers to implement one or more of a verification self-test, a diagnostic method, and monitoring for firmware and software development.

10. The apparatus according to claim 1, wherein said monitor is configured to generate a time stamp of a monitor time.

11. The apparatus according to claim 10, wherein said apparatus is further configured to generate an analysis of time difference that corresponds to values monitored on said software variables and said hardware and firmware registers.

12. The apparatus according to claim 10, wherein said apparatus is configured to generate a granularity of said time stamp between system events and register events that are monitored.

13. The apparatus according to claim 1, wherein said apparatus comprises monitoring hardware configured to connect to one or more internal busses of said system such that the monitoring is non-intrusive.

14. The apparatus according to claim 13, wherein said monitoring hardware is configured to generate a time stamp of a monitor time.

15. The apparatus according to claim 13, wherein said apparatus is configured to filter bit levels of said hardware and firmware registers, such that remaining bits in said full system after said filtering can be assessed to achieve coverage.

16. The apparatus according to claim 1, wherein said apparatus comprises one or more comparators within said first comparator circuit configured to monitor one or more of an address, data, and a trigger trace.

17. The apparatus according to claim 16, wherein said apparatus is further configured to generate an analysis of filtering trace and capture that corresponds to one or more values monitored on said software variables and said hardware and firmware registers.

18. The apparatus according to claim 16, wherein said apparatus is configured to define one or more windows configured to enable (i) said trace and (ii) a capture.

19. The apparatus according to claim 1, wherein said apparatus is configured to generate a trigger for trace and (i) said trigger is generated in response to one or more of a cycle and a register-delta and (ii) said register-delta comprises a difference between a previous value and a current value registered at one or more of said hardware and firmware registers.

20. The apparatus according to claim 19, wherein said apparatus further comprises a CPU configured to (i) log said trace in response to polling the frequency of a read/write operation of said hardware and firmware register or said trigger signal.

21. The apparatus according to claim 20, wherein said apparatus further comprises a memory configured to log said trace.

22. The apparatus according to claim 1, wherein said apparatus comprises software defined monitor, trace and capture in hardware, software and firmware that correspond to trigger, log depth and trace windows.

23. A method for full system real-time monitoring comprising the steps of:
    (A) monitoring one or more software variables down to change rates;
    (B) monitoring one or more hardware registers down to cycle rates;
    (C) monitoring one or more firmware registers down to microcode word fetch rates;
    (D) monitoring a frequency of use of each bit in said one or more hardware resisters and said one or more firmware registers;
    (E) calculating a frequency of use of each bit in said one or more hardware registers and said one or more firmware registers; and
    (F) generating one or more trigger signals with a first comparator circuit to trigger said full system to monitor in real time.

24. A computer readable medium containing one or more sets of computer executable instructions for performing the steps of claim 23.

* * * * *